(12) United States Patent
Saika

(10) Patent No.: US 7,640,588 B2
(45) Date of Patent: Dec. 29, 2009

(54) DATA PROCESSING SYSTEM AND METHOD

(75) Inventor: Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 813 days.

(21) Appl. No.: 11/098,453

(22) Filed: Apr. 5, 2005

(65) Prior Publication Data

US 2006/0156030 A1 Jul. 13, 2006

(30) Foreign Application Priority Data

Jan. 13, 2005 (JP) ............................. 2005-005986

(51) Int. Cl.
*H04L 29/14* (2006.01)
*H04L 15/28* (2006.01)
(52) U.S. Cl. .................... 726/24; 711/111; 710/200
(58) Field of Classification Search ......... 713/193–194; 726/13, 23–25; 711/111–112, 161–163; 710/200
See application file for complete search history.

(56) References Cited

U.S. PATENT DOCUMENTS

| 7,340,774 B2 * | 3/2008 | Hursey et al. ................. 726/22 |
| 2004/0117401 A1 | 6/2004 | Miyata et al. |
| 2005/0144172 A1 * | 6/2005 | Kilian et al. .................. 707/10 |
| 2005/0273858 A1 * | 12/2005 | Zadok et al. ................. 726/24 |

FOREIGN PATENT DOCUMENTS

JP 2004199213 7/2004

* cited by examiner

*Primary Examiner*—Jung Kim
*Assistant Examiner*—Venkat Perungavoor
(74) *Attorney, Agent, or Firm*—Brundidge & Stanger, P.C.

(57) ABSTRACT

A data processing system (102) determines whether or not the access destination according to an access request from an access request source is an infectable storage device that is a storage device (111) that may already store data that has not been virus scanned, and the system changes the virus scan mode executed with respect to the object data of the access request according to the results of the determination as to whether or not the access destination is an infectable storage device.

22 Claims, 10 Drawing Sheets

SELECTABLE VIRUS SCAN MODE
- READ ONLY
- WRITE ONLY
- READ/WRITE
- NO SCAN

SCAN MODE FILE

WRITE ONLY — 110

114

| LUN | LU TYPE | DISK ID | EXTERNAL LU PATH INFORMATION |
|---|---|---|---|
| 1 | INSTALLATION INTERNAL LU (SYSTEM INTERNAL LU) | 1, 2 | — |
| 2 | INSTALLATION INTERNAL LU (USER INTERNAL LU) | 3, 4, 5 | — |
| 3 | VIRTUAL INTERNAL LU | — | EXTERNAL STORAGE SUBSYSTEM ID "1", EXTERNAL LUN "3" ... |
| ⋮ | ⋮ | ⋮ | ⋮ |

FIG. 8

| EXTENSION | SCAN MODE |
|---|---|
| .txt | NO SCANNING |
| .doc | READ/WRITE |
| .jpg | READ ONLY |
| ⋮ | ⋮ |

400

DATA PROCESSING SYSTEM AND METHOD

CROSS-REFERENCE TO PRIOR APPLICATION

This application relates to and claims priority from Japanese Patent Application No. 2005-005986 filed on Jan. 13, 2005 the entire disclosure of which is incorporated herein by reference.

BACKGROUND OF THE INVENTION

The present invention relates to a technology for controlling the execution of virus scanning with respect to data.

For example, the processing disclosed in Japanese Patent Application Laid-open No. 2004-199213 is conducted to check whether or not data is infected with a computer virus (in the present specification, simply referred to as "virus").

Thus, when an access request (read request or write request) to a file on a server is received from a client, the server issues a request to execute virus scanning with respect to the object file (write object file or read object file) of the access request to a scan server that executes virus scanning. When the results of virus scanning confirm that there is no infection with the virus, the server writes the object file to disk on the server or sends the object file to the client.

BRIEF SUMMARY OF THE INVENTION

For example, a new storage device is sometimes connected to a server instead of or in addition to the storage device that has been connected in advance. However, there is a risk of this storage device being a storage device that may store a file that was not virus scanned and was infected with a virus. If a file infected with the virus is read from such storage device, the damage caused by the virus can be expanded.

A method suggested to prevent the occurrence of such an event comprises constantly conducting virus scanning of the access object files and executing the access to the access object file (in other words, writing the write object file into a storage device or sending a read object file to the client) once the absence of virus infection has been confirmed. However, in this case a large load is placed on the server and a long time can be required to process the access request from the client.

Accordingly, it is an object of the present invention to prevent the damage caused by the virus from expanding by using a method other then the method of constantly executing the virus scan of the object data of access requests.

Other objects of the present invention will be made clear from the following explanation.

The data processing system in accordance with the first aspect of the present invention is a data processing system capable of accessing a plurality of storage devices, comprising a processing unit for receiving an access request to any of the storage devices from an access request source, making a first judgment as to whether the access destination accompanying the received access request is a device that that may already store data that has not been virus scanned (an infectable storage device) and a second judgment as to whether the access request is a data read request or write request, and determining whether to virus scan or not the data of the access object based on the results of the first and second judgments.

In one embodiment, the data processing system can access at least one storage device provided in a first storage system, and the infectable storage device can be at least one of the following storage devices (1) to (3):

(1) a storage device of the first storage system associated a storage device provided in a second storage system communicably connected to the first storage system;

(2) a storage device provided in the second storage system communicably connected to the first storage system; and (3) a storage device connected to the first storage system after the set-up time of the first storage system.

In one embodiment, the processing unit can determine to conduct virus scanning of the data of the access object of the read request or write request when the access destination is judged to be the infectable storage device by the first judgment, and can determine to conduct virus scanning of the object data of the access object of the write request when the access destination is judged not to be the infectable storage device by the first judgment.

In one embodiment, the processing unit can determine whether to conduct virus scanning of the data of the access object based on file information of the data of the access object, in addition to the first and the second judgments.

In one embodiment, the processing unit can send the data of the access object to a virus scan unit when the processing unit determines that the data of the access object is to be virus scanned.

In one embodiment, the processing unit can convey information on the address where the data of the access object is stored to a virus scan unit when the processing unit determines that the data of the access object is to be virus scanned.

In one embodiment, the processing unit can manage separately virus scanned data written into a storage device and non-scanned data written into the storage device, and can determine not to conduct virus scanning when the object data of the read request is the scanned data, even if a read scan mode of executing virus scanning when the access request is a read request has been set.

In one embodiment, the processing unit can execute virus scanning in a preset scan mode of a write scan mode of executing virus scanning when the access request is a write request and a read scan mode of executing virus scanning when the access request is a read request, and the processing unit can change the preset scan mode according to the first judgment result.

In one embodiment, the processing unit can change the preset virus scanning mode after the first judgment result indicating that the access destination is the infectable storage device has been obtained a prescribed number of times.

In one embodiment, changes of the preset virus scanning mode can be carried out after the virus scan mode preceding the changes has been saved, and then the processing unit can judge whether or not the data that has not been virus scanned is present in the infectable device and to set the saved virus scanning mode again when the data that has not been virus scanned is judged not to be present.

The data processing system in accordance with the second aspect of the present invention is a data processing system capable of accessing a plurality of storage devices, comprising a storage unit for storing first information relating to a storage device where data that has not been virus scanned is stored and second information relating to data that has been virus scanned, and a processing unit for executing a first processing of determining as to whether data of the access object of the access request is to be virus scanned based on the type of the access request and the first information and second processing of determining as to whether data of the access object of the access request is to be virus scanned based on the type of the access request and the second information.

In one embodiment, the processing unit can execute the second processing when the second information is stored in the storage unit and can execute the first processing when the second information is not stored in the storage unit.

In one implementation mode, a data processing system can comprise at least one computer, and a program storage area that stores at least one computer program to be read by at least one of the computers. At least one of the computers that has read at least one of the computer programs receives an access request from an access request source. Further, at least one of the computers determines whether the access destination according to the received access request is an infectable storage device that is a storage device that may already store data that has not been virus scanned. Further, at least one of the computers executes virus scan processing according to a prescribed virus scan mode when the access destination is determined not to be the infectable storage device and executes virus scan processing not according to the prescribed virus scan mode when the access destination is determined to be the infectable storage device.

Here, the "computer" may be a processor such as a microprocessor or CPU and may be a computer machine such as a personal computer or a server machine. In other words, the "data processing system" may be implemented with one computer machine (for example, a server machine) and may be implemented with a plurality of computer machines connected to a communication network or the like and communicating with each other.

Further, the "storage device" may be a physical storage device (for example, a hard disk, a magnetic disk, an optical disk, a magnetic tape, or a semiconductor memory) and may be a logical storage device (called, for example, a logical volume, a logical device, or a logical unit) prepared on a physical storage device.

The "program storage area" can be prepared on a memory such as a ROM, but is not limited thereto and may be a storage area prepared on a storage device of another type.

The "virus scan mode" may be a method for executing virus scanning (an algorithm according to which the virus scanning is executed) and may be a timing for executing the virus scanning (for example, virus scanning is executed with respect to data when the write object data is written into a storage device, or virus scanning is executed with respect to data when the read object data is sent to a read request source).

Further, the "execution of virus scan processing" may mean virus scan execution by a data processing system or a virus scan execution request from the data processing system to another system (for example, a server) capable of executing the virus scanning. In the latter case, the data processing system can send the object data of the access request or a copy thereof to the other system. The other system can execute the virus scan with respect to the data (for example, object data or a copy thereof) from the data processing system and can send the virus scan execution results (for example, whether or not data was infected or, if the data was infected, the object data from which the virus has been eliminated) to the data processing system. The data processing system receives the execution results from the other system and by analyzing the execution results can determine whether or not the object data has been infected with the virus. When the data processing system determines that there was no virus infection, it can execute the access to the object data.

In one implementation mode, the data processing system can access at least one first storage device provided in a storage subsystem. In this case, the infectable storage device can be at least one of the following storage devices (1) to (3):

(1) a first storage device provided in the storage subsystem after the setup time of the first storage device;

(2) a first storage device associated with a second storage device provided in another storage subsystem communicably connected to the storage system; and (3) a first storage device associated with the second storage device after the setup time of the first storage device.

In one implementation mode, the prescribed virus scan mode may be a write scan mode meaning that the virus scanning is executed when the access request is a write request. At least one of the computers that have read at least one computer program executes the virus scan processing, while ignoring the write scan mode, if the computer receives a read request and determines that the access destination according to the received read request is the infectable storage device.

In one implementation mode, when at least one of the computers that have read at least one of the computer programs receives an access request after the results determining that the access destination was the infectable storage device are received the prescribed number of times, the computer can execute the virus scan processing according to the virus scan mode other than the prescribed virus scan mode with respect to the object data of the access request, regardless of the access destination of this access request.

In one implementation mode, when at least one of the computers that have read at least one of the computer programs obtains the results determining that the access destination is the infectable storage device the prescribed number of times, the computer saves the prescribed virus scan mode and instead sets the virus scan mode other than the prescribed virus scan mode, thereafter determines whether or not none of the infectable storage devices is present, and again sets the saved prescribed virus scan mode when none of the infectable storage devices is determined to be present.

Here, "saving the prescribed virus scan mode", for example, may be an operation of associating (for example, setting into a memory) the information meaning that the prescribed virus scan mode is not taken as the virus scanning mode to be executed with the prescribed virus scan mode data having the prescribed scan mode written therein or an operation of moving the prescribed virus scan mode data to another storage area (for example, a directory or a folder) from the prescribed reference storage area (for example, a directory or a folder) of the aforementioned at least one computer. Further, "again setting the saved prescribed virus scan mode", for example, may be an operation of associating (for example, setting into a memory) the information meaning that the prescribed virus scan mode is taken as the virus scanning mode that has to be executed with the prescribed virus scan mode data or an operation of returning (moving) the prescribed virus scan mode data from another storage area to the prescribed reference storage area.

In one implementation mode, at least one computer that has read at least one computer program can change the virus scan mode based on the file information of the object file of the access request (for example, according to the object file extension) in any one case of the case where the access destination is determined to be an infectable storage device and the case where the access destination is determined not to be the infectable storage device.

In one implementation mode, at least one computer that has read at least one computer program can manage separately the scanned data that is written into the storage device after being virus scanned and non-scanned data that is written into the storage device without being virus scanned. Furthermore, when the read request is received and object data of the read request is the scanned data, this at least one computer can send the object data to the access request source, without executing the virus scan processing according to the read scan mode, even if a read scan mode is set that means the execution of the virus scan when the access request is a read request.

In one implementation mode, a data processing method can comprise the steps of receiving (for example, a receiving step) an access request from an access request source (for example, a computer terminal), determining (for example, a determination step) whether or not the access destination according to the received access request is an infectable storage device that is a storage device that may already store data that has not been virus scanned, executing virus scan processing according to the prescribed virus scan mode when the access destination is determined not to be the infectable storage device, and executing virus scan processing not according to the prescribed virus scan mode when the access destination is determined to be the infectable storage device (a control step).

In one implementation mode, a data processing system can comprise means for receiving an access request from an access request source, determination means for determining whether or not the access destination according to the received access request is an infectable storage device that is a storage device that may already store data that has not been virus scanned, and control means for executing virus scan processing according to the prescribed virus scan mode when the access destination is determined not to be the infectable storage device and executing virus scan processing not according to the prescribed virus scan mode when the access destination is determined to be the infectable storage device.

In one implementation mode, the prescribed virus scan mode may be a write scan mode meaning that the virus scan is executed when the access request is a write request. The control means can execute the virus scan processing if the access destination according to the read request received from the access request source is determined to be the infectable storage device.

In one implementation mode, when the control means receives an access request after the results determining that the access destination is the infectable storage device are received the prescribed number of times, the control means can execute the virus scan processing according to the virus scan mode other than the prescribed virus scan mode, which is to be executed when the access destination is not an infectable storage device, with respect to the object data of the access request, regardless of the access destination of this access request.

In one implementation mode, the data processing system can comprise means for saving the prescribed virus scan mode and instead setting the virus scan mode other than the prescribed virus scan mode when the results determining that the access destination is the infectable storage device are obtained the prescribed number of times and means for thereafter determining whether or not none of the infectable storage devices is present and again setting the saved prescribed virus scan mode when none of the infectable storage devices is determined to be present.

In one implementation mode, the data processing system can comprise means for changing the virus scan mode based on the file information of the object file of the access request (for example, according to the object file extension) in any one case of the case where the access destination is determined to be an infectable storage device and the case where the access destination is determined not to be the infectable storage device.

In one implementation mode, the data processing system can comprise means for managing separately the scanned data that is written into the storage device after being virus scanned and non-scanned data that is written into the storage device without virus scan. In this case, when the read request is received and object data of the read request is the scanned data, the control means can send the object data to the access request source, without executing the virus scan processing, even if a read scan mode is set that means the execution of the virus scan when the access request is a read request.

The above-described means can be constituted by computer programs, but they may be also constituted by hardware or combinations of hardware and computer programs. The computer program is read and executed by the computer. Further, during information processing conducted after reading the computer program into the computer, the storage areas present on the hardware resources such as a memory may be used appropriately.

In accordance with the present invention, the expansion of damage caused by the virus can be prevented by a method other than the method of constantly executing virus scan with respect to the object data of access requests.

BRIEF DESCRIPTION OF THE DRAWINGS

FIG. 8 shows a configuration example of he relationship information 400 prepared in the second embodiment of the present invention.

DETAILED DESCRIPTION OF THE PREFERRED EMBODIMENTS

Several embodiments of the present invention will be described below with reference to the appended drawings.

Figure 1:
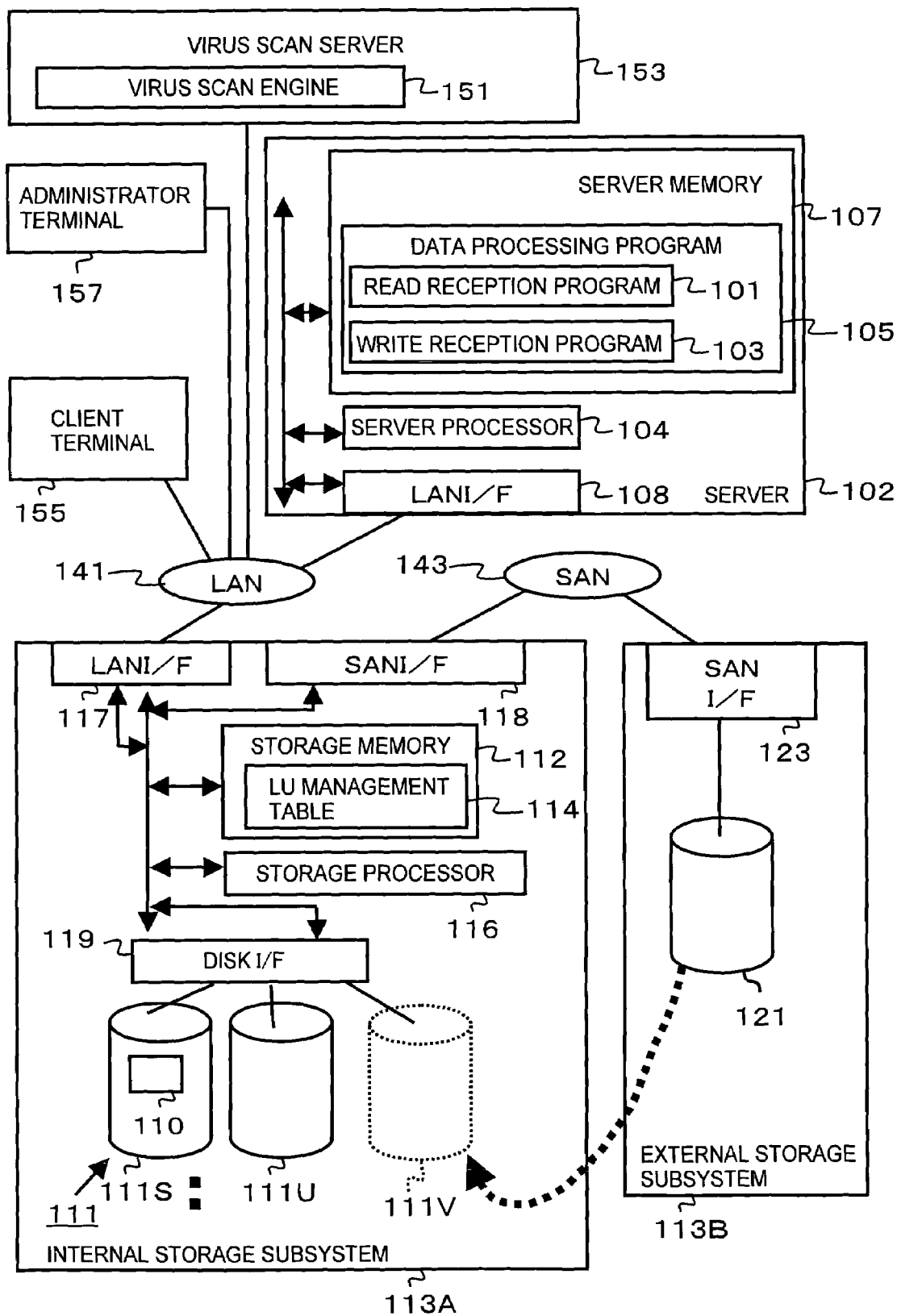
FIG. 1 shows a configuration example of the data processing system of the first embodiment of the present invention.

FIG. 1 shows a configuration example of the data processing system of the first embodiment of the present invention.

The data processing system of the first embodiment comprises a client terminal 155, a plurality of storage subsystems 113A, 113B, an administrator terminal 157, a virus scan server 153, and a server 102. The client terminal 155, storage subsystem 113A, administrator terminal 157, virus scan server 153, and server 102 are connected, for example, to a communication network (in the present embodiment, it is assumed to be a LAN (Local Area Network) 141. A plurality of storage subsystems 113A, 113B are communicably connected to each other via a SAN (Storage Area Network) 143 or a special cable (for example, a fiber channel cable).

The client terminal 155 is a computer machine (for example, a personal computer) comprising hardware resources such as CPU or memory. The client terminal 155 sends access requests requesting the access (write or read) of data (for example, files) to the server 102 via the LAN (Local Area Network) 141.

The storage subsystem 113A accesses the server 102 via the LAN 141, but the storage subsystem 113B is not communicably connected to the server 102. For the server 102 to use the storage resources of the storage subsystem 113B, the server 102 designates the storage resources of the storage subsystem 113A associated with the storage resources of the storage subsystem 113B, thereby using the storage resources of the storage subsystem 113B via the storage subsystem 113A. Here, for the sake of convenience, the storage subsystem 113A will be referred to as "internal storage subsystem 113A" and the storage subsystem 113B will be referred to as "external storage subsystem 113B". Further, the internal storage subsystem 113A and external storage subsystem 113B use the respective logical storage devices (logical units; abbreviated hereinbelow as "LU"). The LU used in the internal storage subsystem 113A is called "internal LU" and the LU used in the external storage subsystem 113B is called "external LU".

Because the internal storage subsystem 113A and external storage subsystem 113B can have substantially identical configurations, the explanation will be conducted with respect to the internal storage subsystem 113A as a representative example. The internal storage subsystem 113A comprises at least one disk driver (for example, hard disk drive) and a plurality of internal LU 111 provided on at least one disk drive(reference number 111 may be physical storage device). A plurality of internal LU 111, for example, comprise a LU (referred to hereinbelow as "system internal LU") 111S storing a variety of data relating to system configuration of the internal storage subsystem 113A and a LU (referred to hereinbelow as "user internal LU") 111U for storing data that are the access object of the server 102. Furthermore, there is also present a virtual internal LU (referred to hereinbelow as "virtual internal LU") 111V which is not an internal LU where the storage areas present on the disk drive were allocated (in other words, the installed internal LU) and has no storage areas present on the disk drive that are allocated thereto. At least one external LU 121 selected from one or more LU (referred to hereinbelow as external LU) 121 of the external storage subsystem 113B is associated with the virtual internal LU 111V. When the internal storage subsystem 113A receives from the server 102 an access request having the virtual internal LU 111V as an access destination, the subsystem processes this access request by taking as an access destination the external LU 121 associated with the virtual internal LU 111V. This will be described below in greater detail.

The internal storage subsystem 113A comprises a LAN interface device (the interface device is described hereinbelow as "I/F") 117 connected to the LAN 141, a SAN I/F 118 connected to the SAN 143, and a disk I/F 119 connected to the disk drive. Further, the internal storage subsystem 113A also comprises at least one processor (referred to hereinbelow as "storage processor") 116 for controlling the operation of the internal storage subsystem 113A and at least one memory (referred to hereinbelow as "storage memory") 112. In the storage memory 112, there are prepared a LU management table 114 having recorded therein the information relating to a plurality of internal LU 111 and a cash area (for example, cash memory) for temporarily storing data exchanged between the server 102 or external storage subsystem 113B and the disk drive.

The administrator terminal 157 is a computer machine (for example, a personal computer) comprising hardware resources such as CPU or memory. The administrator terminal 157 updates the LU management table 114 via the LAN (Local Area Network) 141 in response to the administrator's operation. The configuration and updating of the LU management table 114 will be described below.

The virus scan server 153 is a server machine comprising hardware resources such as CPU or memory. The virus scan server 153 comprises a computer program (referred to hereinbelow as "virus scan engine") 151 for executing the virus scan. The virus scan engine 151, for example, when access object data or a copy thereof is received from the server 102, refers to a virus definition file (file having written therein the information relating to the virus) that has been stored in the prescribed storage area (for example, in a hard disk that is not shown in the figure) and makes a decision (in other words, conducts virus scan) as to whether or not the aforementioned access object data or a copy thereof has been infected with the virus based on this virus definition file. When the virus scan engine 151 decides that there is no infection with the virus, it can execute at least one of the following operations (A) to (C):

(A) send data describing the virus scan results showing that there is no infection with the virus to the server 102;

(B) send checked data that has not been infected with the virus (access object data or a copy thereof) to the server 102; and (C) send to the server 102 the location information (for example, an address or access path) in the internal storage subsystem 113A (or external storage subsystem 113B) where the data (access object data or a copy thereof) that has not been infected with the virus is present. On the other hand, when the virus scan engine 151 decides that there was infection with the virus, it can execute at least one of the following operations (a)-(c):

(a) send data describing the virus scan results showing that there was infection with the virus to the server 102;

(b) eliminate the virus and send access object data or a copy thereof that is not infected with the virus to the server 102; and (c) send to the server 102 the location information (for example, an address or access path) in the internal storage subsystem 113A (or external storage subsystem 113B) where the data (access object data or a copy thereof) that has been infected with the virus is present.

The server 102 may be a server of any type. For example, the server 102 may be a file server functioning as a NAS (Network Attached Storage) and may be a FTP (File Transfer Protocol) server having a file transfer function.

The server 102 comprises a LAN I/F 108 connected to the LAN 141, at least one processor (referred to hereinbelow as "server processor") 104 for controlling the operation of the server 102, and at least one memory (referred to hereinbelow as "server memory") 107 for storing one more computer programs to be read into the server processor 104. A data processing program 105 is one of the computer programs to be read into the server processor 104.

The data processing program 105 executes an access (read and write) relating to the access object data (for example, read object data such as download and write object data such as upload) or requests the execution of virus scanning with respect to the access object data or a copy thereof from the virus scan server 153. The data processing program 105 comprises a read reception program 101 and a write reception program 103.

The read reception program 101 receives from the client terminal 155 a read request relating to the data located inside the user internal LU 111. Once the read request has been received, the read reception program 101 determines as to whether the access destination according to the read request is an internal LU or an external LU and changes the execution contents of the virus scan processing relating to the read object data that is the object of the read request according to whether the access destination is an internal LU or an external LU. When the execution of virus scan processing demonstrates that the read object data has not been infected with the virus, the read reception program 101 sends the read object data to the client terminal 155, which is the read request source, and when the data is found to be infected with the virus, the program does not send at least the read object data to the client terminal 155.

The write reception program 103 receives from the client terminal 155 a write request relating to the data located inside the user internal LU 111. Once the write request has been received, the write reception program 103 determines as to whether the access destination according to the write request is an internal LU or an external LU and changes the execution contents of the virus scan processing relating to the write object data that is the object of the write request according to whether the access destination is an internal LU or an external LU. When the execution of virus scan processing demonstrates that the write object data has not been infected with the virus, the write reception program 103 writes the write object data to the LU of the access destination, and when the data was found to be infected with the virus, the program does not write at least the write object data to the LU.

For example, the following can be considered as the "virus scan processing execution contents": referring to the prescribed scan mode file 110 stored in the prescribed location (for example, in the system internal LU 111S) and executing the virus scan processing according to the virus scan mode written into the scan mode file 110; executing the virus scan processing without referring to the prescribed scan mode file 110 (that is, regardless of which virus scan mode has been set); and executing the virus scan processing by employing a virus scan mode other than the virus scan mode written in the prescribed scan mode file 110.

Figures 2A, 2B:
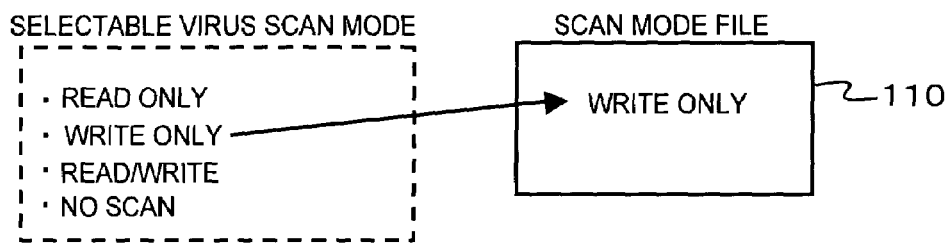
FIG. 2A illustrates example of the virus scan mode types and scan mode file.
FIG. 2B shows a configuration example of a LU management table.

Further the term "virus scan mode" as employed in the present embodiment can stand for the timing for executing the virus scan processing. As shown in FIG. 2A, the following types of virus scan modes can be employed: a mode of executing the virus scan processing only during reading (read only), a mode of executing the virus scan processing only during writing (write only), a mode of executing the virus scan processing during reading and writing (read/write), and a mode of executing the virus scan processing neither during reading nor during writing (no scan). The aforementioned prescribed scan mode file 110 has a record of the type of the virus scan mode that was selected by a person such as the administrator or user from a plurality of virus scan modes that can be selected. The scan mode file 110 can write in any of the administrator terminal 157, client terminal 155, and server 102. Further, the storage location of the scan mode file is not limited to the system internal LU 111S and may be different therefrom (for example, the storage memory 112).

Further, the "execution of virus scan processing" may be the execution of virus scanning with a virus scan engine that is composed of the server 102. The term "execution of virus scan processing" as employed in the present embodiment is the process in which the server 102 sends an access object data or a copy thereof to the virus scan server 153 and requests the virus scan server 153 to virus scan the access object data or a copy thereof. In response to this request, the virus scan server 153 executes the virus scanning of the access object data or a copy thereof with the virus scan engine 151.

The data processing system of the present embodiment will be outlined below.

The connection mode of the aforementioned computers 153, 157, 155, 113A, 113B, and 102 is merely an example, the present invention is not limited to this connection mode and a variety of connection modes can be employed. For example, the computers 153, 157, 155, 113A, 113B, and 102 may be connected to a common network (for example, SAN, LAN, internet, or a special cable). Furthermore, the server 102 may be connected to the internal storage subsystem 113A via a fiber channel rather than via the LAN 141.

In the present embodiment, as described hereinabove, the LU management table 114 is stored in the storage memory 112.

FIG. 2B shows a configuration example of the LU management table 114.

The LU management table 114 has recorded therein a LUN that is the number (not limited to a number, other types of ID may be used) for identifying the internal LU for each of a plurality of internal LU 111, the type of this internal LU, a disk ID that is an ID of a disk drive constituting the internal LU, and an external LU path information representing a path to the external LU associated with the internal LU. The administrator terminal 157 can create the LU management table 114 on the storage memory, for example, during the setup, following the instructions of the administrator, and after the setup, the LU management table 114 can be updated, if necessary. Here, "if necessary" may refer to the case where an external LU is anew associated with the internal LU, for example, by connecting the external storage subsystem 113B anew to the internal storage subsystem 113A or to the case where the internal LU is set anew by replacing or adding the disk drive.

An installed internal LU and a virtual internal LU are the types of the internal LU. The external LU may be associated with the virtual internal LU, but may be also associated with the installed internal LU. In this case, for example, when data is written into the installed internal LU associated with the external LU, this data may be also written into the external LU.

The external LU path information is, for example, the information comprising the LUN of the external LU and the ID of the external storage subsystem 113B having this external LU. The internal storage subsystem 113A can access the external LU associated with the internal LU following the path represented by the external LU path information. More specifically, for example, when the storage processor 116 of the internal storage subsystem 113A receives an access request from the server 102 and determines that the internal LU with the access destination according to the access request is the virtual internal LU 111V by referring to the LU management table 114, it generates the access request in which the external LU 121 associated with this virtual internal LU 111V is taken as the access destination and sends the generated access request following the path represented by the external path information corresponding to this virtual internal LU 111V. The external storage subsystem 113B conducts the access processing with respect to the aforementioned associated external LU 121 according to this access request. As a result, when the virtual internal LU 111 is taken as the write destination of the write object data, the write object data is written into the external LU 121 of the external storage subsystem 113B via the internal storage subsystem 113A. On the other hand, when the virtual internal LU 111V is taken as the read source of the read object data, the read object data is sent from the external LU 121 of the external storage subsystem 113B to the server 102 (or client terminal 155) via the internal storage subsystem 113A.

The data processing system of the first embodiment is outlined hereinabove. The processing flow executed by the data processing program 105 is a specific feature of this data processing system. For example, flows of the following two types can be considered as processing flows to be executed by the data processing program 105. Those processing flows of the first and second types will be successively described below.

(1) Processing Flow of the First Type

Figure 3:
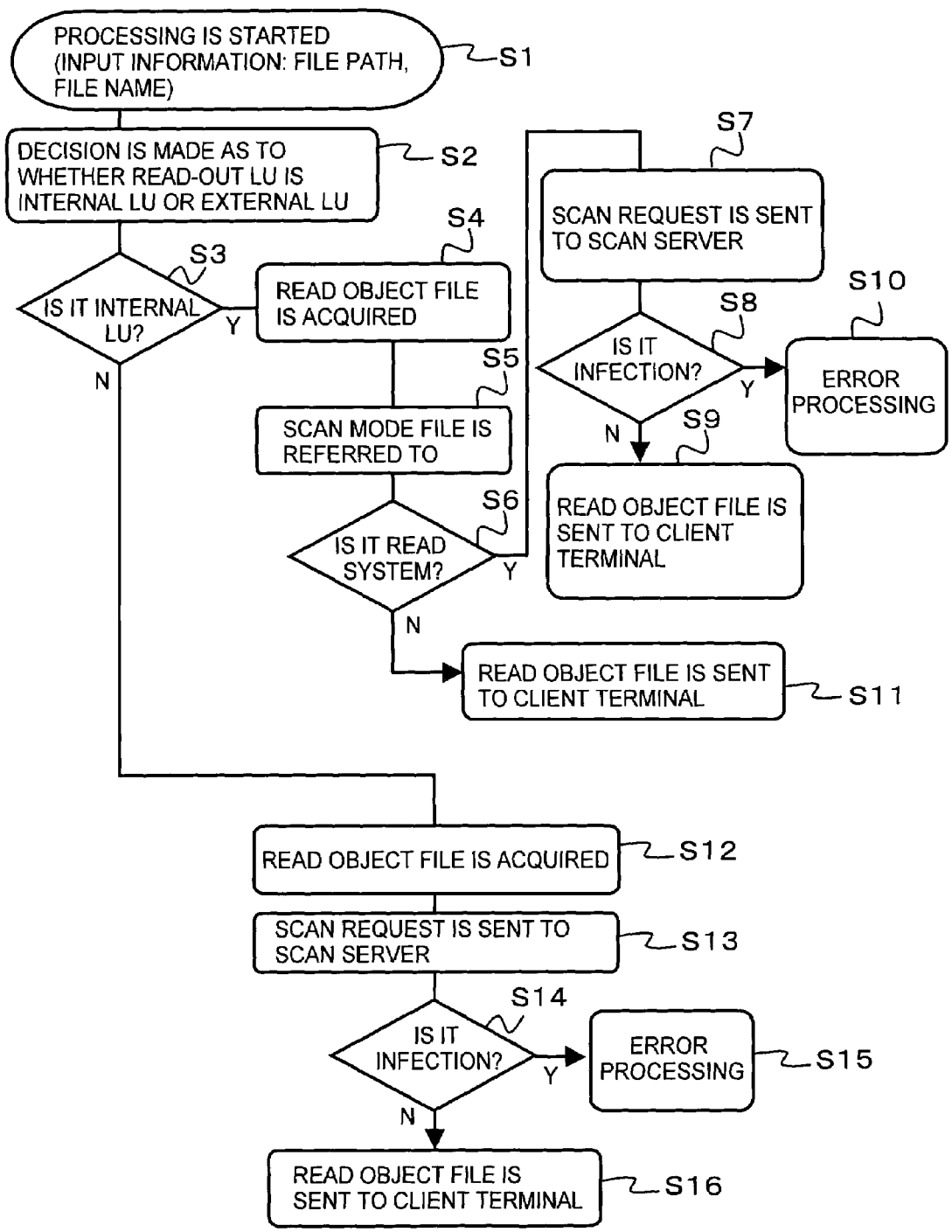
FIG. 3 shows a processing flow of the first type in which the read reception program 101 of the data processing program 105 can be executed.

FIG. 3 shows the processing flow of the first type that can be executed by the read reception program 101 of the data processing program 105.

When the server 101 receives a read request comprising the file path and file name of the read object file (step S1), the below-described operations of step S2 and subsequent steps are initiated.

First, the read reception program 101 that was read into the server processor 104 determines whether the LU serving as the read source according to the read request is an internal LU or an external LU (S2). More specifically, the read reception program 101 communicates the file path contained in the read request to the internal storage subsystem 113A and requests the internal storage subsystem 113A to determine whether the LU serving as the read source is an internal LU or an external LU. In response to this inquiry, the internal storage subsystem 113A determines whether the LU serving as the read source is an internal LU or an external LU from the communicated file path and LU management table 114 and communicates the determination results to the server 102 The server 102 can determine whether the LU serving as the read source according to the read request is an internal LU or an external LU by interpreting the determination results. Here, the "determination whether . . . is an internal LU or an external LU" conducted by the internal storage subsystem 113A is in other words, for example, the determination as to whether or not the read source (that is, the access destination) is the internal LU associated with the external LU. As a result, if the read source is not the internal LU associated with the external LU, a decision result "internal LU" is obtained, and when it is the internal LU associated with the external LU, the decision result "external LU" is obtained.

When the results of step S2 show that the read source is the "internal LU (the internal LU that is not associated with the external LU)" (Y in S3), the read reception program 101 reads the read object file according to the access request received in S1 from the internal LU 111U of the internal storage subsystem 113A (S4) and temporarily holds it in a storage region such as the servo memory 107. Further, the read reception program 101 refers to the scan mode file 110 located in the system internal LU 111S (S5) and specifies the virus scan mode that is presently set.

As a result, when the virus scan mode is specified not as the virus scan mode of the read system (for example, "read only" and "read/write") (N in S6), the read reception program 101 sends the read object file that was read in S4 to the client terminal 115 (S11).

On the other hand, when the virus scan mode is specified as a virus scan mode of the read system (Y in S6), the read object file that was read in S4 or a copy thereof is sent to the server 153 and virus scanning of the read object file or a copy thereof is requested (S7). In this case, virus scanning of the read object file or a copy thereof is conducted with the virus scan engine 151 of the virus scan server 153 and the results are communicated. When the read reception program 101 finds that there is no infection based on the communicated results (N in S8), it sends the read object file that was read in S4 to the client terminal 115 (S9). However, when the communicated results demonstrate that there was infection (Y in S8), the read reception program 101 executes error processing (S10). For example, processing of at least one type from the processing of notifying the client terminal 155 that the read object file cannot be sent to the client terminal 155 because it has been infected with the virus, processing of deleting the read object file infected with the virus, and processing of sending to the client terminal 155 the read object file that became a file that is not infected with the virus due to elimination of the virus can be employed as the error processing executed at this stage.

When the results of step S2 show that the read source is the "external LU (the external LU that is associated with the external LU)" (N in S3), the read reception program 101 reads the read object file according to the access request received in S1 from the internal LU 111U of the internal storage subsystem 113A (S12) and temporarily holds it in a storage region such as the servo memory 107. Further, the read reception program 101 executes the virus scan processing without referring to the scan mode file 110, in other words, by ignoring the virus scan mode that was set in the scan mode file 110. Thus, the read reception program 101 sends the read object file that was read in S12 or a copy thereof to the virus scan server 153 and requests the virus scan of the read object file or a copy thereof. Subsequent processing is identical to that of S8 to S10 (S14 to S16). Further, in S16, the read object file is sent from the external LU 121 to the server 102 (or client terminal 155) via the internal storage subsystem 113A.

Figure 4:
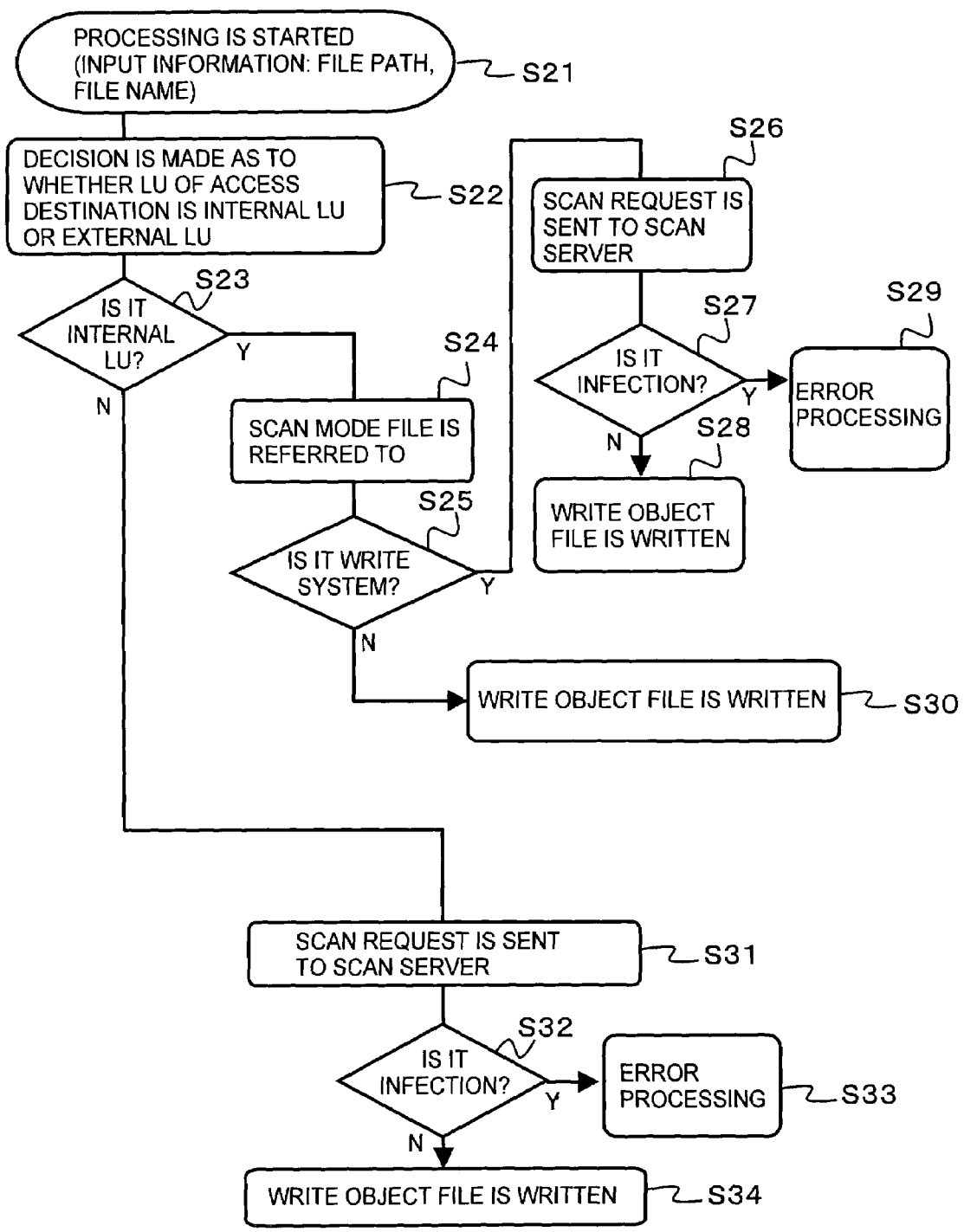
FIG. 4 shows a processing flow of the first type in which the write reception program 103 of the data processing program 105 can be executed.

FIG. 4 shows the processing flow of the first type that enables the execution of the write reception program 103 of the data processing program 105.

When the server 101 receives a write request comprising the file path and file name of the write object file (step S21), the below-described operations of step S22 and subsequent steps are initiated. The write object file is, for example, temporarily stored in the prescribed storage region such as the servo memory 107.

First, the write reception program 103 that was read into the server processor 104 determines whether the LU serving as the write destination according to the write request is an internal LU or an external LU (S22). In S22, the processing identical to that of the above-described S2 is conducted.

When the results of step S22 show that the write source is the "internal LU" (Y in S23), the write reception program 103 refers to the scan mode file 110 located in the system internal LU 111S (S24) and specifies the virus scan mode that is presently set.

As a result, when the virus scan mode was specified not as the virus scan mode of the write system (for example, "write only" and "read/write") (N in S25), the write reception program 103 writes the write object file according to the write request received in S21 into the internal LU 111U according to the file path (S30).

On the other hand, when the virus scan mode of the write system was specified (Y in S25), the write object file or a copy thereof received in S21 is sent to the virus scan server 153 and a virus scan of the write object file or a copy thereof is requested (S26). As a result, similarly to the case of S7, the results of the virus scan of the write object file or a copy thereof are communicated from the virus scan server 153. The write reception program 103 writes the write object file received in S21 into the internal LU 111U (S28) when the communicated results demonstrate that there is no infection (N in S27). However, when the communicated result indicate the presence of infection (Y in S27), the write reception program 103 executes error processing (S29). The error processing executed herein is identical to the error processing of S10.

When the result of S22 is such that the write destination is "external LU" (N in S23), the write reception program 101 executes the virus scan processing without referring to the scan mode file 110, in other words, by ignoring the virus scan mode that was set in the scan mode file 110. Thus, the processing identical to that of S26-S29 is conducted (S31-S34). Further, in S34, the write object file is sent and written to the external LU 121 via the internal storage subsystem 113A.

The processing flow of the first type is explained above. Thus, in the processing flow of the first type, the virus scan processing is always conducted when the access destination is the external LU 121, regardless of the virus scan mode that is described in the scan mode file 110, in other words, the virus scan mode that is presently set.

(2) Processing Flow of the Second Type

The processing flow of the second type will be described below. In the processing flow of the second type, when the access destination is determined the prescribed number of times (for example, one time) to be an "external LU", the scan mode "read/write" are set instead of the scan mode that is presently set, regardless of which scan mode is presently set.

For example, this is specifically done as follows.

Figure 5:
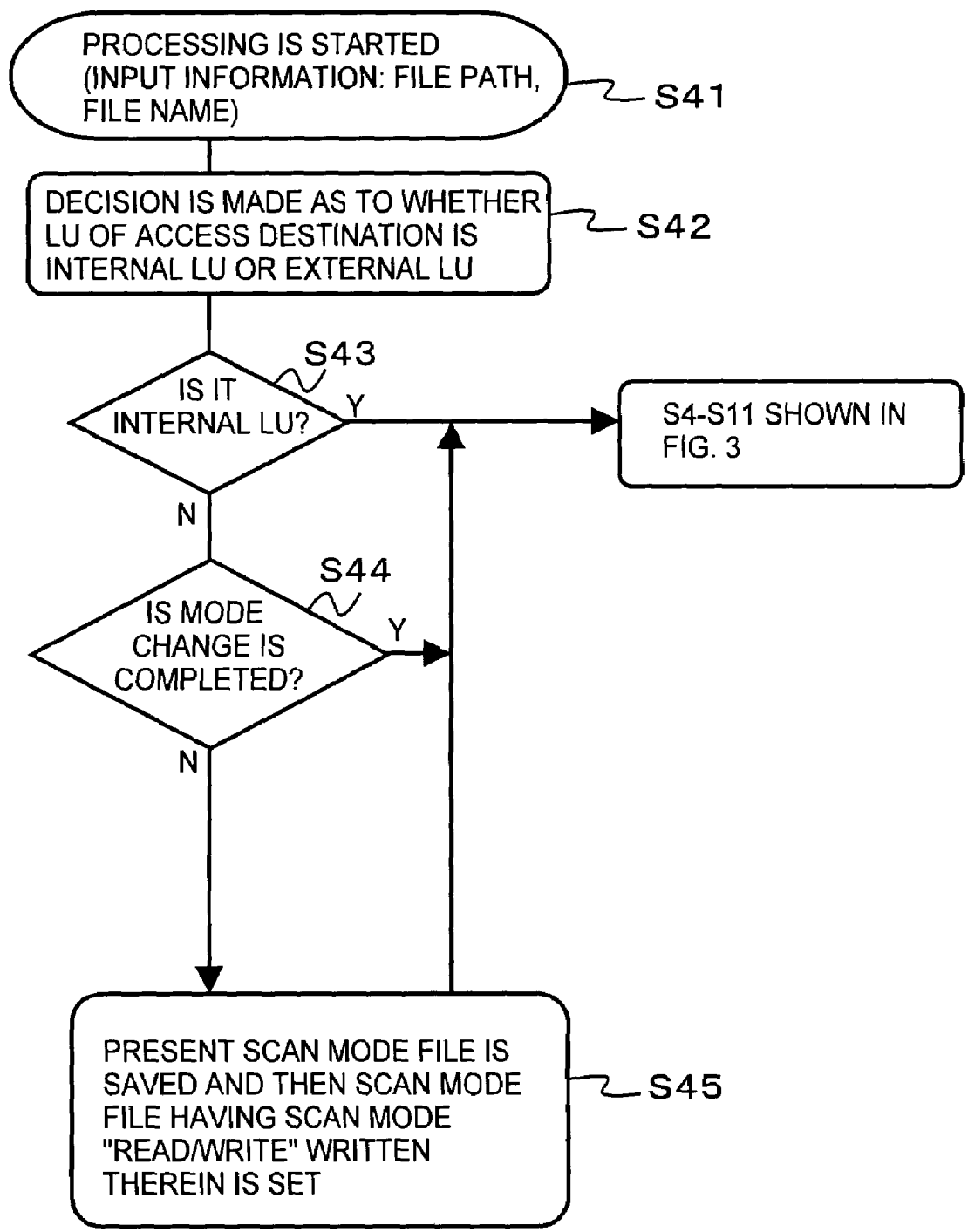
FIG. 5 shows a processing flow of the second type in which the read reception program 101 can be executed.
Figure 6:
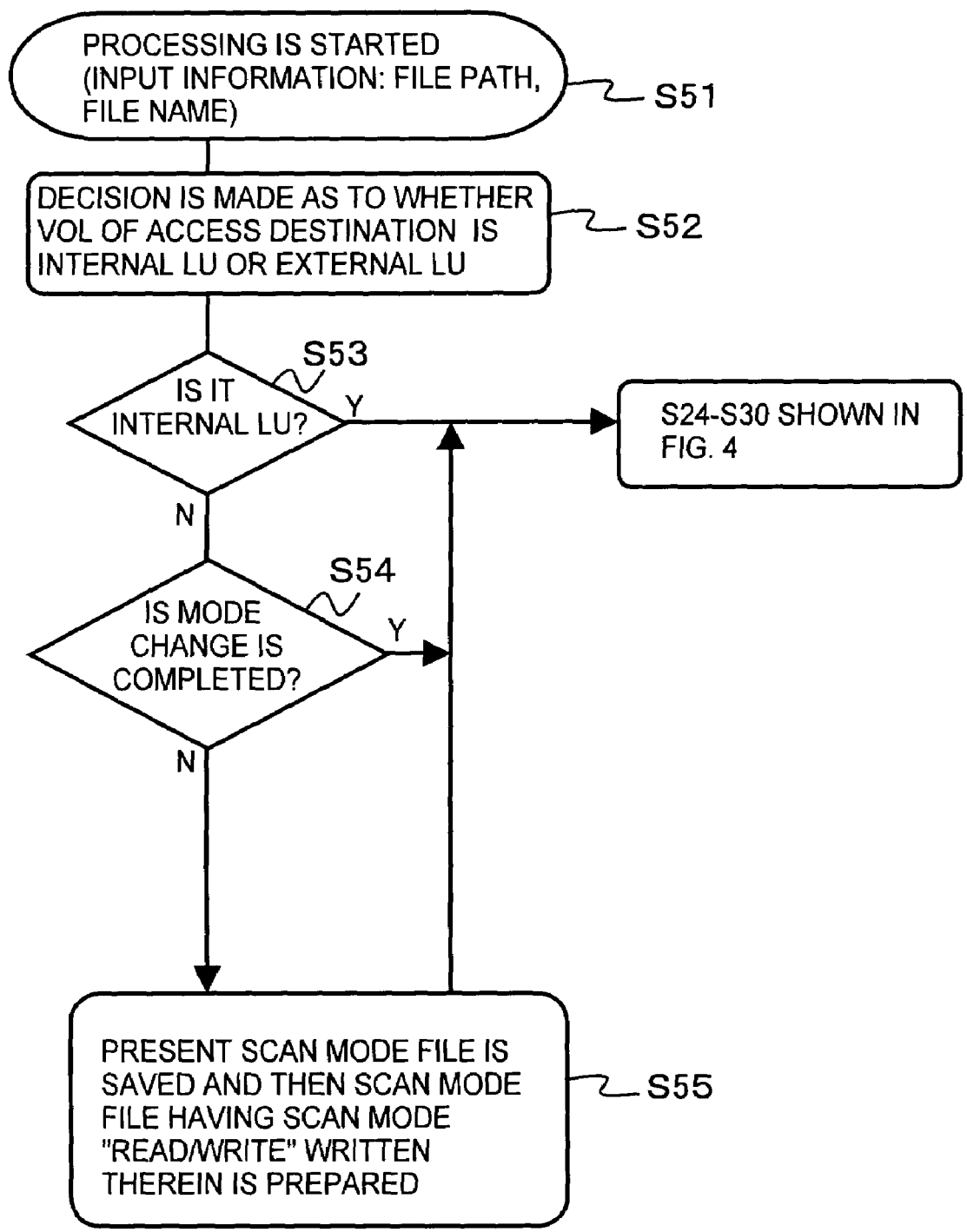
FIG. 6 shows a processing flow of the second type in which the write reception program 103 can be executed.

FIG. 5 shows the processing flow of the second type that can be executed by the read reception program 101. FIG. 6 shows the processing flow of the second type that can be executed by the write reception program 103.

Referring to FIG. 5 and FIG. 6, it is clear that when the access destination is even once determined to be an "external LU" (N in S43 or N in S53) by conducting the processing (S41 and S42) identical to that of S1 and S2 or processing (S51 and S52) identical to that of S21 and S22, the data processing program 105 saves the present scan mode file 110 (for example, moves the file 110 from the prescribed folder to another folder) and then sets a new scan mode file (for example, writes this file into the prescribed folder) where the scan mode "read/write" was written (N in S44, and S45, or N in S54, and S55). At this time, the data processing program 105 may set the fact that the virus scan mode was changed into the prescribed storage area.

In the case where an access request is thereafter received and the access destination is determined to be an "external LU" (N in S43 or N in S53), the data processing program 105 can conduct processing of S4 and subsequent steps or processing of S24 and subsequent steps, without conducting processing of S45 or S55, because the scan mode has already been changed (Y in S44 or Y in S54).

The processing flow of the second type was explained above. In the processing flow of the second type, a new scan mode file is set instead of the saved scan mode file 110 and then this new scan mode file is referred to in the processing referring to the scan mode file of S5 or the like.

Figure 7:
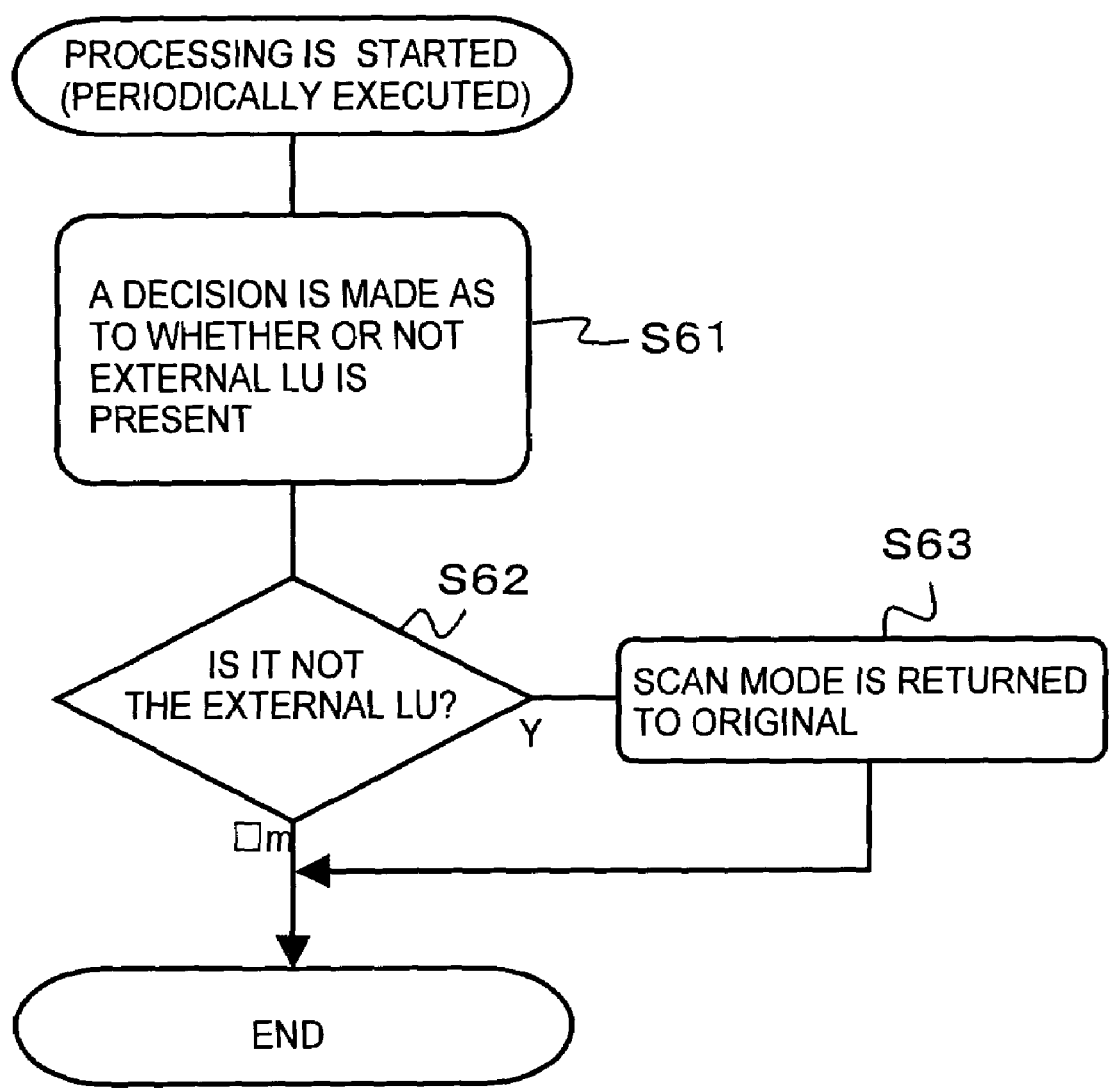
FIG. 7 shows an example of the processing flow of recovery of the saved scan mode file.

Further, when at least the processing flow of the second type is employed, it is possible to execute the processing that returns the setting of the virus scan mode to the original setting, as shown in FIG. 7.

For example, the data processing program 105 determines whether or not an external LU is present (S62). Here, the data processing program 105 sends an inquiry as to whether or not an external LU is present to the internal storage subsystem 113A and receives from the internal storage subsystem 113A the results of the decision made in response to this inquiry (for example, the results of the decision as to whether or not the external LU path information has been written even once in the LU management table 114). As a result, it can be determined whether or not the external LU is present.

When it is found that there is no even one external LU (Y in S62), the data processing program 105 can return the saved scan mode file 110 to its original location, in other words, the data processing program can again set the virus scan mode that was set prior to changes as the present virus scan mode (S63). More specifically, for example, the saved scan mode file 110 is returned to the end terminal of the reference path of the scan mode file. As a result, the scan mode file 110 is again referred to in the processing referring to the virus scan file of S5 or the like.

With the above-described first embodiment, when the access destination is an "internal LU", the virus scan processing is conducted according to the virus scan mode desired by the person such as a user or an administrator, but when the access destination is an "external LU", virus scan processing is forcibly executed, without following the virus scan mode. As a result, the expansion of damage caused by the virus can be prevented at a load on the server 102 that is lower than that with the method by which virus scan is constantly executed with respect to the access requested object data.

The second embodiment of the present invention will be explained below. In the explanation below, features of the second embodiment that are different from those of the first embodiment are mainly explained and the explanation of the features that are common for the two embodiments is omitted or simplified (the same is true for the below-described third embodiment and fourth embodiment).

In the second embodiment, the data processing program 105 can change the virus scan mode according to the extension of the access object file in at least one of the case where the access destination is an "internal LU" and the case where it is an "external LU".

More specifically, for example, the relationship information 400 shown as an example in FIG. 8 is included in the data processing program 105 or stored in the servo memory 107. The relationship information 400 represents the relationship between an extension of a file and a scan mode. In the relationship information 400, for example, a "no scan" virus scan mode is associated with an extension (for example, ".txt") representing a file (for example, a text file) that may be infected with a virus but has a low probability (for example, substantially zero probability) of this virus being executed during writing or reading. Further, for example, a "no scan" virus scan mode is associated with an extension (for example, ".doc") representing a file (for example, a Word file) such that both the file reading and the file writing are conducted and when it is infected with the virus, there is a possibility of the virus being executed during writing or reading. Further, for example, a "read only" virus scan mode is associated with an extension (for example, ".jpg") representing a file (for example, a file compressed in an irreversible manner (for example, a JPEG file)) with a low probability of file update.

The data processing program 105 can execute the following processing, that is, the processing determining a virus scan mode corresponding to the extension of the access object file from the relationship information 400, for example, instead of the processing referring to the scan mode file of S5 and the like.

Further, in the present embodiment, the explanation was conducted by employing an extension as an example, but the invention is not limited to the extension and file information of other types also may be employed. This is because, for example, when the OS (operating system) is UNIX (trade name), only some files are particularly aware of extension, and when the OS is Macintosh (trade name), because an application attribution is contained in the file information section called a resource fork, no extension is used. In those cases, the above-described operations can be also conducted by using file information of types different from extensions.

The third embodiment of the present invention will be explained below.

In the third embodiment, all the LU that are at risk of storing data that have not been virus scanned can be handled as the infectable LU. In the first embodiment, all the external LU were handled as the infectable LU, but in the third embodiment, not every external LU is handled as the infectable LU. Conversely, some of the internal LU are handled as infectable LU.

Figure 9A:
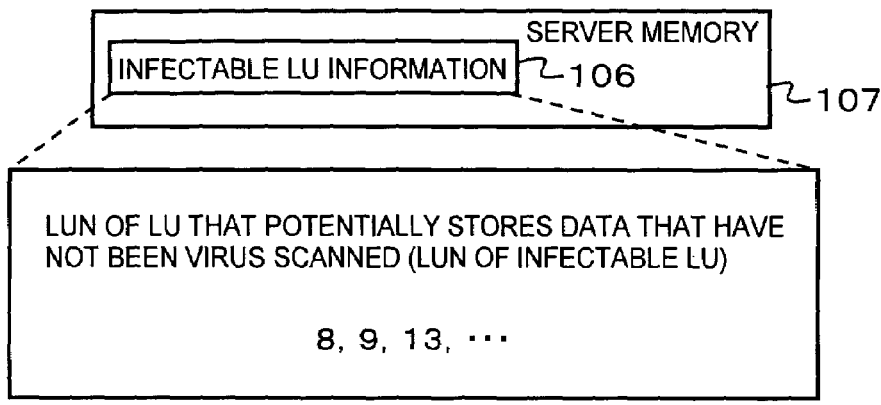
FIG. 9A shows a configuration example of the infectable LU information prepared in the third embodiment of the present invention.

In the third embodiment, for example, as shown in FIG. 9A, the infectable LU information 106 that has the LUN of the infectable LU written therein is recorded in the server memory 107 (and/or storage memory 112). This information 106 can be updated, for example, in the manner as follows.

Figure 9B:
FIG. 9B and FIG. 9C are explanatory drawings illustrating an example of processing conducted when the infectable LU information is updated.

For example, as shown by an example in FIG. 9B, when the virus scan mode of a write system was not set and, therefore, the virus was stored in a certain LU, without virus scanning, the LUN of this LU is added to the infectable LU information 106, regardless of whether this LU is an "internal LU" or an "external LU" (S35).

Figure 9C:
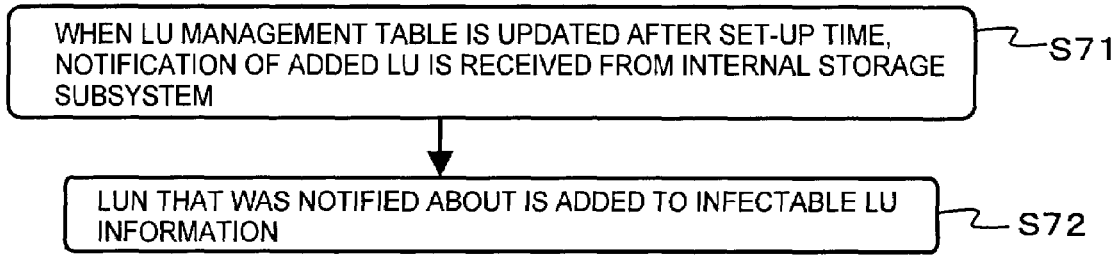

Further, for example, as shown in FIG. 9C, when the LU management table 114 was updated from the manager terminal 157 or the like after the set-up time (for example, the time when the internal storage sub-system is set up), the server 102 receives from the internal storage sub-system 113A a notification on the LUN newly added to the LU management table 114 (S71). For example, the case where a LU is newly set on the replaced or added disk drive 115 or the case where a new external LU 121 is associated with the virtual internal LU 111V can be considered as cases where the LUN is added. In those cases, the LUN of the newly set LU or the LUN of the new external LU 121 and/or the virtual internal LU 111V associated therewith is notified. The server 102 adds the notified LUN to the infectable LU information 106 (S72).

Figure 9D:
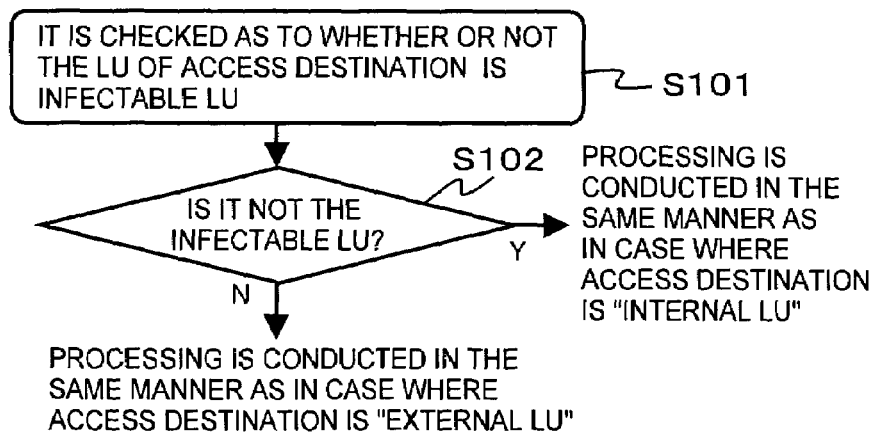
FIG. 9D is an explanatory drawing illustrating an example of processing conducted when an access request from a client terminal is received.

When the server 102 receives an access request from the client terminal 155, for example, as shown in FIG. 9D, the server determines whether or not the LU of the access destination according to the access request is an infectable LU by referring to the infectable LU information 106 by using a file path or the like contained in the access request (S101). When the server 102 determines that the access destination is not an infectable LU (Y in S102), the processing can be executed in the same manner as in the case where the access destination is an "internal LU", and when the server determines that the access destination is an infectable LU (N in S102), the processing can be executed in the same manner as in the case where the access destination is an "external LU".

The fourth embodiment of the present invention will be described below.

In the fourth embodiment, a file that was virus scanned during writing is not subjected to virus scan processing during reading even if the virus scan mode of a read system was set.

Figure 10A:
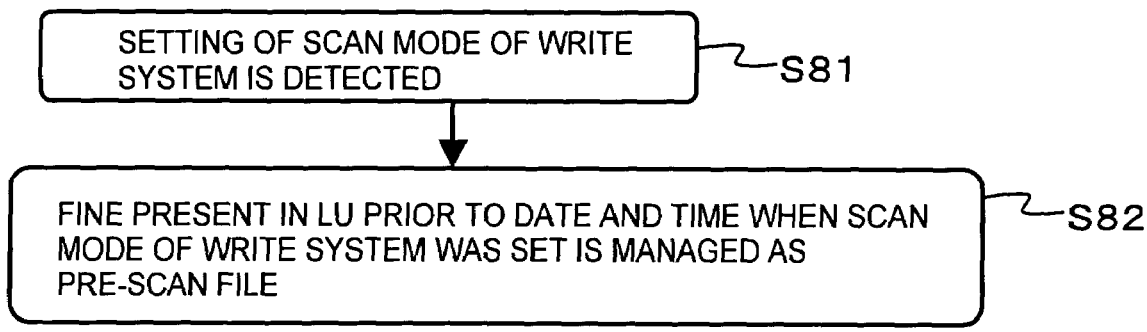
FIG. 10A illustrates an example of processing flow relating to the case where the management of a pre-scan file is conducted in the fourth embodiment of the present invention.

More specifically, for example, when the setting of the virus scan mode of a write system is detected by the server 102 (S81), as shown in FIG. 10A, the files present at the date prior to the detection time are managed as pre-scan files (S82). More specifically, for example, the server 102 can detect that the virus scan mode of a write system was set by receiving from the manager terminal 157 or the like a notification to the effect that the virus scan mode of a write system was set. Further, for example, the server 102 can conduct the management of S82 by recording the ID (for example, a file path and a file name) of the files that were present at the date prior to the detection time as pre-scan files in the prescribed storage area.

Figure 10B:
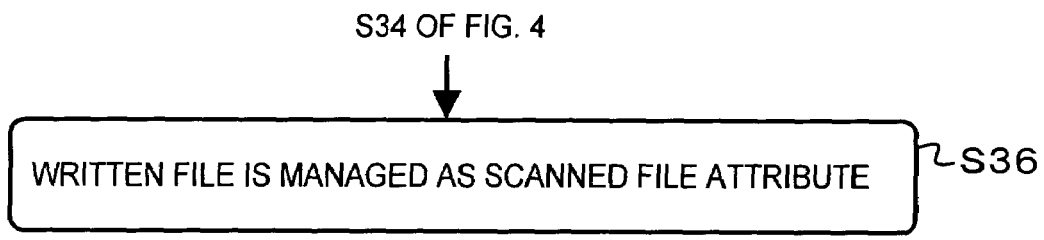
FIG. 10B illustrates an example of processing flow relating to the case where the management of a scanned file is conducted.

When a write request is received after S82, because the virus scan mode of a write system was set, the virus scan is executed with respect to the write object file. For this reason, as shown by an example in FIG. 10B, when a virus scanned write object file was written into a LU, the server 102 manages this write object file as a scanned file (S36). More specifically, for example, the server 102 conducts the management of S36 by recording the ID (for example a file path and a file name) of this write object file as a scanned file in the prescribed storage area.

Figure 10C:
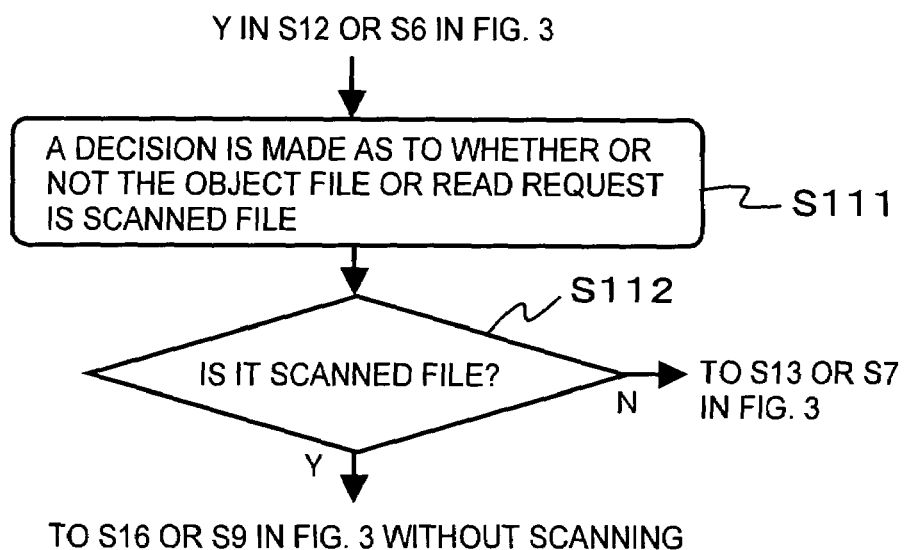
FIG. 10C illustrates an example of processing flow conducted when a read request is received in a state where a scanned file and a pre-scan file are managed.

When a read request is received in a state in which a pre-scan file and a scanned file are managed, as shown by an example in FIG. 10C, the server 102 determines whether or not the read object file is a scanned file (S111) and, if it is a scanned file (Y in S112), sends the read object file to the client terminal 155, without conducting the virus scan processing (S16 or S9 in FIG. 3).

Several preferred embodiments of the present invention were described above, but they merely illustrate the present invention, and the scope of the present invention is not meant to be limited only to those embodiments. The present invention can be implemented in a variety of other modes. For example, it is possible not to separate the server 102 and the internal storage sub-system 113A, and the function (for example, the data processing program 105) of the server 102 may be loaded into the internal storage sub-system 113A (for example, functions of the NAS or FTP server may be loaded into the internal storage sub-system 113A). In this case, for example, the internal storage sub-system 113A can receive an access request from the client server 155 and execute at least one processing flow among those shown in FIGS. 3 to 7 and FIGS. 10A to 10D. Further, the virus scan engine 151 may be loaded into the server 153 other than the server 102, as shown in FIG. 1, or may be loaded into the server 102 itself, or when the functions of the server 102 are not loaded into the internal storage sub-system 113A, the virus scan engine may be loaded into the internal storage sub-system 113A.

The invention claimed is:

1. A data processing system capable of accessing a plurality of storage devices, comprising:
   a processing unit for receiving an access request to any of said storage devices from an access request source,
   wherein the processing unit makes a first determination as to whether the access destination accompanying said received access request is a device that may already store data that has not been virus scanned (an infectable storage device) and makes a second determination as to whether said access request is a data read request or write request, and determines whether or not to virus scan the data of the access object according to said access request based on a result of said first determination and a result of said second determination wherein said processing unit manages separately virus scanned data written into a storage device and non-scanned data written into the storage device, and wherein said processing unit determines not to conduct virus scanning when the object data of said read request is said scanned data, even if a read scan mode of executing virus scanning has been set.

2. The data processing system according to claim 1,
wherein said data processing system can access at least one storage device provided in a first storage system, and
wherein said infectable storage device is at least one of the following storage devices (a) to (c):
(a) a storage device of said first storage system associated a storage device provided in a second storage system communicably connected to said first storage system;
(b) a storage device provided in the second storage system communicably connected to said first storage system; and
(c) a storage device connected to said first storage system after the set-up time of said first storage system.

3. The data processing system according to claim 1, wherein said processing unit determines to conduct virus scanning of the data of the access object of the read request or write request when said access destination is judged to be said infectable storage device by said first determination, and determines to conduct virus scanning of the object data of the access object of the write request ignoring the virus scan mode when said access destination is judged not to be said infectable storage device by said first determination.

4. The data processing system according to claim 1, wherein said processing unit determines whether to conduct virus scanning of the data of the access object based on file information of the data of the access object, in addition to said first determination and said second determination.

5. The data processing system according to claim 1, wherein said processing unit sends the data of said access object to a virus scan unit when the processing unit determines that the data of the access object is to be virus scanned.

6. The data processing system according to claim 1, wherein said processing unit conveys information on the address where the data of said access object is stored to a virus scan unit when the processing unit determines that the data of the access object is to be virus scanned.

7. The data processing system according to claim 1, wherein said processing unit executes virus scanning in a preset scan mode of a write scan mode of executing virus scanning when the access request is a write request and a read scan mode of executing virus scanning when the access request is a read request, and said processing unit changes the preset scan mode according to said result of said first determination.

8. The data processing system according to claim 7, wherein said processing unit changes said preset virus scanning mode after said result of said first determination indicating that said access destination is said infectable storage device has been obtained a prescribed number of times.

9. The data processing system according to claim 8,
wherein changes of said preset virus scanning mode are carried out after the virus scan mode preceding the changes has been saved,
wherein, then it is judged whether or not the data that has not been virus scanned is present in said infectable device, and
wherein said saved virus scanning mode is set again when the data that has not been virus scanned is judged not to be present.

10. A data processing method comprising:
receiving an access request to any of a plurality of storage devices including at least one storage device provided in a first storage system from an access request source;
making a first determination as to whether the access destination accompanying said received access request is an infectable storage device that may already store data that has not been virus scanned;
making a second determination as to whether said access request is a data read request or write request;
determining whether to virus scan or not the data of the access object based on a result of said first determination and a result of said second determination,
wherein said infectable storage device is at least one of the following storage devices (a) to (c):
(a) a storage device of said first storage system associated with a storage device provided in a second storage system communicably connected to said first storage system;
(b) a storage device provided in the second storage system communicably connected to said first storage system; and
(c) a storage device connected to said first storage system after the set-up time of said first storage system;
managing separately virus scanned data written into a storage device and non-scanned data written into the storage device; and
determining not to conduct virus scanning when the object data of said read request is said scanned data, even if a read scan mode of executing virus scanning when the access request is a read request has been set.

11. The data processing method according to claim 10, further comprising:
determining to conduct virus scanning of the data of the access object of the read request or write request when said access destination is judged to be said infectable storage device by said first determination; and
determining to conduct virus scanning of the object data of the access object of the write request ignoring the virus scan mode when said access destination is judged not to be said infectable storage device by said first determination.

12. The data processing method according to claim 10, further comprising:
determining whether to conduct virus scanning of the data of the access object based on file information of the data of the access object, in addition to said first determination and said second determination.

13. The data processing method according to claim 10, further comprising:
sending the data of said access object to a virus scan unit when it is determined that the data of the access object is to be virus scanned.

14. The data processing method according to claim 10, wherein said processing unit conveys information on the address where the data of said access object is stored to a virus scan unit when the processing unit determines that the data of the access object is to be virus scanned.

15. The data processing method according to claim 10, further comprising:
    executing virus scanning in a preset scan mode of a write scan mode of executing virus scanning when the access request is a write request and a read scan mode of executing virus scanning when the access request is a read request; and
    changing the preset scan mode according to said result of said first determination.

16. The data processing method according to claim 15, wherein said processing unit changes said preset virus scanning mode after said result of said first determination indicating that said access destination is said infectable storage device has been obtained a prescribed number of times.

17. A data processing system comprising:
    a first determination module that determines whether or not the access destination according to an access request issued from an access request source is an infectable storage device that is a storage device that may already store data that has not been virus scanned; and
    a controller in a processer unit that executes virus scan processing on the data of the access object according to said access request, according to the prescribed virus scan mode on when said access destination is determined not to be the infectable storage device, and executes virus scan processing on the data of the access object, regardless of what said prescribed virus scan mode is which virus scan mode when said access destination is determined to be the infectable storage device, wherein said prescribed virus scan mode is any of the following mode (a) to (d):
    (a) a read only mode of executing the virus scan processing only during reading;
    (b) a write only mode of executing the virus scan processing only during writing;
    (c) a read/write mode of executing the virus scan processing during reading and writing; and
    (d) a no scan mode of executing the virus scan processing neither during reading nor during writing, wherein said control module: executes virus scan processing when said access request is read request and said access destination is determined to be the infectable storage device, even if said prescribed virus scan mode is said write only mode or said no scan mode; and
    executes virus scan processing when said access request is write request and said access destination is determined to be the infectable storage device, even if said prescribed virus scan mode is said read only mode or said no scan mode.

18. The data processing system according to claim 1, further comprising:
    a setting module that saves said prescribed virus scan mode and instead sets said read/write mode other than said prescribed virus scan mode, when results of determining that the access destination is the infectable storage device is obtained a prescribed number of times; and
    a second determination module that thereafter determines whether or not none of said infectable storage devices is present,
    wherein said setting module saves said set read/write mode and again sets said saved prescribed virus scan mode other than said prescribed virus scan mode, when none of said infectable storage devices is determined to be present.

19. The data processing system according to claim 17, wherein said controller:
    chooses the virus scan mode among said virus scan modes (a) to (b), corresponding to the file information of the object file of said access request in case where said access destination is determined not to be the infectable storage device; and executes virus scan processing according to the chosen virus scan mode.

20. The data processing system according to claim 17, further comprising:
    a management module that manages separately the scanned data that is written into the storage device after being virus scanned and non-scanned data that is written into the storage device without being virus scanned,
    wherein said controller, when the access request is a read request and object data of said read request is said scanned data, sends said object data to said access request source without executing the virus scan processing, even if said prescribed virus scan mode is said read only mode or read/write mode.

21. The data processing system according to claim 1,
    wherein said infectable storage device is an external Logical Unit (LU), and
    wherein said external LU is a LU which is a first storage system receiving said access request provides to said access request resource and is associated with a LU in a second storage system which is coupled to said storage system.

22. The data processing systems according to claim 1, wherein said infectable storage device is a storage device provided after the setup time.

* * * * *